United States Patent [19]

Sharp

[11] 4,133,860
[45] Jan. 9, 1979

[54] METHOD OF MOULDING A REINFORCED THERMOPLASTIC ARTICLE

[75] Inventor: Herbert J. Sharp, Greenford, England

[73] Assignee: United States Steel Corporation, Pittsburgh, Pa.

[21] Appl. No.: 739,775

[22] Filed: Nov. 8, 1976

Related U.S. Application Data

[63] Continuation of Ser. No. 540,761, Jan. 14, 1975, abandoned.

[30] Foreign Application Priority Data

Jan. 14, 1974 [GB] United Kingdom ............... 1742/74

[51] Int. Cl.² .................. B29C 17/07; B29D 3/02
[52] U.S. Cl. .......................... 264/528; 264/527; 264/523; 425/525
[58] Field of Search ................. 264/89, 90, 92, 93, 264/94, 96, 97, 98, 99, 275, 278, DIG. 52; 425/DIG. 214, 242 B, 387 B, 326 B, 522, 523, 525

[56] References Cited

U.S. PATENT DOCUMENTS

| | | | |
|---|---|---|---|
| 2,361,348 | 10/1944 | Dickson et al. | 264/278 O |
| 3,028,290 | 4/1962 | Roberts et al. | 264/94 O |
| 3,238,287 | 3/1966 | Chapman | 264/278 X |
| 3,358,062 | 12/1967 | Lemelson | 264/97 X |
| 3,372,429 | 3/1968 | Kato | 264/98 X |
| 3,395,209 | 7/1968 | Millard | 264/278 X |
| 3,423,494 | 1/1969 | Roberts | 264/94 O |
| 3,636,151 | 1/1972 | Nagai | 264/98 X |
| 3,875,280 | 4/1975 | Story | 264/92 O |

FOREIGN PATENT DOCUMENTS

47-33499  8/1972  Japan ..................... 425/242 B

OTHER PUBLICATIONS

Jones et al., *Blow Molding*, N.Y. Reinhold, 1961, p. 45.

*Primary Examiner*—Jan H. Silbaugh
*Attorney, Agent, or Firm*—William L. Krayer

[57] ABSTRACT

The invention relates to a method of producing an article comprising a hollow three dimensional array of reinforcement elements encapsulated in a thermoplastic material, whereby a hollow parison of said thermoplastic material is located within said array of reinforcement elements, said reinforcement array being located in a mould spaced apart from the mould surface, and said parison being expanded into conformity with said mould surface to encapsulate said reinforcement by the production of a pressure drop across the wall of said parison.

4 Claims, 1 Drawing Figure

U.S. Patent     Jan. 9, 1979     4,133,860
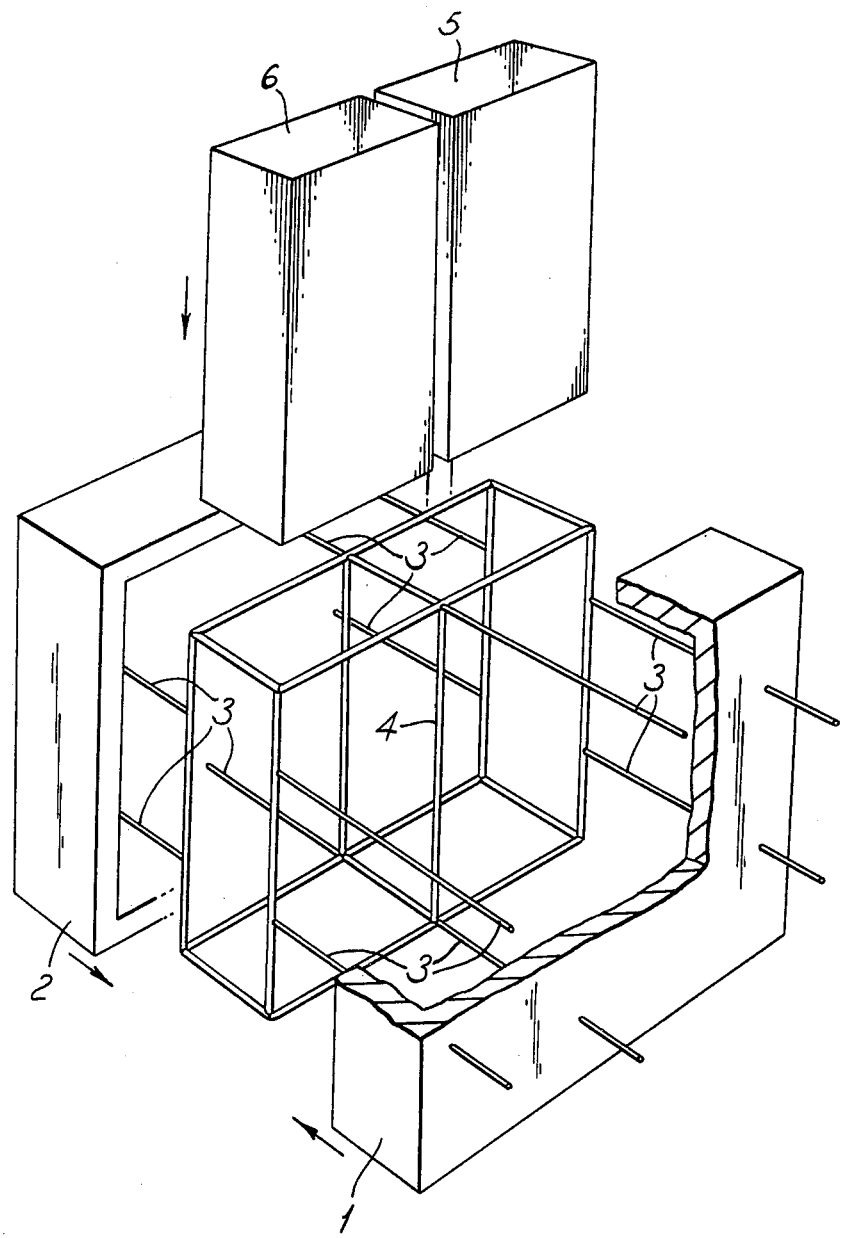

METHOD OF MOULDING A REINFORCED THERMOPLASTIC ARTICLE

This is a continuation of application Ser. No. 540,761, filed Jan. 14, 1975, now abandoned.

Encapsulation moulding, that is to say the process of moulding a reinforced article by forming a moulding compositon around reinforcement which is, say, located in a mould spaced from the mould surface by pins which are retracted as the forming process proceeds, is proving to be very valuable. The resulting product has the advantage that the reinforcement is completely encapsulated and there is an adequate thickness of the resin or other moulding material outside the reinforcement so that the natural properties of the material, such as resilience, are apparent. However there is a limitation to this process that it is not possible to make hollow articles, such as crates, at least without a very complicated mould construction.

We have now appreciated that this problem can be overcome by an ingenious combination of encapsulation moulding and blow moulding processes.

In accordance with the present invention one or more hollow parisons of thermoplastic material are introduced inside a hollow three-dimensional configuration of reinforcement which is located in a mould spaced from the mould surface, and a differential pressure is set up between the interior and exterior of the parisons so that the parisons are expanded into conformity with the mould surface whilst substantially encapsulating the reinforcement. The parisons will normally still be soft when introduced into the reinforcement and will set after expansion and therefore encapsulation has been completed.

As with more conventional blow moulding, the or each parison may be expanded by introducing inside it gas, such as air, under pressure, although a vacuum may also be applied through the mould surface to the exterior of the parison.

Also as with conventional blow moulding, the tubular parisons may be cut from a continuous extrusion, the mould either working beneath the extrusion head or the parison being carried from the extrusion head to the mould operating position. Top or bottom blowing is equally possible.

The reinforcement is preferably spaced from the mould surface by pins at least some and usually all of which are retractable into the mould surface as the parison envelops the reinforcement during the expansion step.

The resulting product will be hollow with encapsulated reinforcement and an opening into the hollow interior of the product may be produced by the blowing head, or by a blocking member around which the mould closes, or the opening may be trimmed after the thermoplastic material has set and the mould is opened to release the product.

One example of a blow moulding method according to the present invention will now be described with reference to the accompanying drawing which is a perspective view, partly broken away, of a two-part mould showing a three dimensional reinforcement which is to be encapsulated by a thermoplastic material.

The two mould halves 1 and 2 are shown in their open position in which they are retracted away from their working position. The mould halves will normally be guided on tie bars near the four corners of the machine, these being omitted in the drawing for the sake of clarity.

Each of the mould halves has inserted through it a number of pins 3 which are movable in the directions of their lengths, independently of the mould halves 1 and 2. In the example the pins 3 are shown supporting a three dimensional reinforcement 4 for a pallet. Although it may sometimes be necessary to provide pins which are movable in the vertical direction, in the example the pins are so shaped at their ends that when they engage the elements of the reinforcement 4 they support the reinforcement 4 vertically as well as laterally.

The thermoplastics material which is to encapsulate the reinforcement to form the finished pallet is provided in the form of two tubular parisons 5 and 6 which may be extruded from a position either immediately above the mould or elsewhere and then carried to the mould. The parisons 5 and 6 are shown in the position which they would occupy just before being loaded into the mould.

The parisons are lowered into positions between the elements of the reinforcement 4 and the mould halves 1 and 2 are then closed together. In order to carry out the encapsulation process the two parisons are expanded by the application inside them of air under pressure and the tubular parisons are therefore forced outwards against the surfaces of the mould cavity at the same time encapsulating the reinforcement 4. Blowing may be carried out from the top or bottom of the mould as desired. The blowing apparatus itself is not shown in the drawing.

If the shape of the mould cavity and hence of the finished article is more complicated than that shown in the example then it may be necessary for a vacuum to be applied in addition to the blowing inside the parison in order that the thermoplastics material is drawn against the surface of the mould cavity at every point.

As the encapsulation process proceeds the thermoplastics material is able to support the reinforcement without the pins 3 and these may be withdrawn gradually until they are flush with the internal surface of the mould so that no cavities are left in the encapsulating thermoplastics material and so the finished article may have completely smooth surfaces.

However, in some cases the reinforcement structure may be of such a complicated construction that not all the pins may be retractable and in this case if complete encapsulation is to be ensured it may be possible to replace such pins as are not retractable by inserts which are not a part of the mould and which are integrated into the finished article on encapsulation. Such inserts may take the form of simple pegs or pins or may be of a more complicated nature if they are to serve additional functions.

In some applications it may be an advantage for the steel reinforcement to extend outside the confines of the encapsulating thermoplastics material, for example where the reinforcement serves another purpose such as for connecting one article to another. In this case the mould halves may be provided with suitably shaped recesses in their surfaces into which parts of the steel reinforcement may extend when the two mould halves are brought together and this thus allows the reinforcement to extend outside the thermoplastic outer surface of the article. It is also possible for the steel reinforcement to be supported by its cooperation with such recesses in the mould halves and thus do away with some of the supporting pins.

I claim:

1. A method of producing an article comprising a hollow three dimensional array of elongate reinforcement elements encapsulated in a thermoplastic material, the method comprising a blow moulding process which includes the steps of locating said three dimensional array of elongate reinforcement elements within a mould in a position to provide reinforcement of said article and spaced apart from the surface of said mould a distance sufficient to allow encapsulation of said elongate elements of said array by said thermoplastic material, said array being supported vertically and horizontally in a fixed position in relation to said mould during encapsulation by a plurality of retractable supports; providing at least one hollow soft parison of thermoplastic material inside said three dimensional array, providing an increase in pressure inside said parison to expand said parison into conformity with said mould surface while substantially encapsulating said reinforcement elements with said thermoplastic material, and, while the expanding and encapsulating step proceeds, gradually retracting said supports to a withdrawn position so that said thermoplastic material fills the cavities left by said retractable supports, and supports said array, and allowing said thermoplastic material to cool and set.

2. A method in accordance with claim 1, wherein said parison is expanded by introducing inside said parison a gas under pressure.

3. A method according to claim 2, wherein a vacuum is is additionally applied through said mould surface to the exterior of said parison.

4. A method according to claim 1, wherein said retractable supports are pins advanced to hold said reinforcement and spaced apart from said mould surface by said pins, said pins being retracted into said mould surface to a position substantially flush with said mould surface when encapsulation of said array has reached a point where said encapsulating thermoplastic material can support and locate said array.

* * * * *